(12) United States Patent
Friedl et al.

(10) Patent No.: US 8,919,203 B2
(45) Date of Patent: Dec. 30, 2014

(54) THERMAL PROTECTION ELEMENT FOR A PRESSURE SENSOR

(75) Inventors: Alexander Friedl, Graz (AT); Wolfgang Michelitsch, Graz (AT)

(73) Assignee: PIEZOCRYST ADVANCED SENSORICS GmbH, Graz (AT)

( * ) Notice: Subject to any disclaimer, the term of this patent is extended or adjusted under 35 U.S.C. 154(b) by 225 days.

(21) Appl. No.: 13/699,665

(22) PCT Filed: May 24, 2011

(86) PCT No.: PCT/EP2011/058467
§ 371 (c)(1),
(2), (4) Date: Nov. 23, 2012

(87) PCT Pub. No.: WO2011/147829
PCT Pub. Date: Dec. 1, 2011

(65) Prior Publication Data
US 2013/0068030 A1    Mar. 21, 2013

(30) Foreign Application Priority Data
May 25, 2010  (AT) .................................. A 854/2010

(51) Int. Cl.
*G01L 7/08*  (2006.01)
*G01L 19/06*  (2006.01)

(52) U.S. Cl.
CPC ......... *G01L 19/0681* (2013.01); *G01L 19/0636* (2013.01); *G01L 19/0663* (2013.01)
USPC ........................................................... 73/715

(58) Field of Classification Search
USPC .................................................... 73/700–756
See application file for complete search history.

(56) References Cited

U.S. PATENT DOCUMENTS 4,711,703 A * 12/1987 Wright et al. ............... 205/782.5
5,939,636 A * 8/1999 Glaser ............................. 73/706
7,436,646 B2 * 10/2008 Delince et al. ................ 361/273

FOREIGN PATENT DOCUMENTS

DE             3421149 A1 * 12/1984

* cited by examiner

*Primary Examiner* — Andre Allen
(74) *Attorney, Agent, or Firm* — Jordan IP Law, LLC; Todd A. Vaughn

(57) ABSTRACT

The invention relates to a thermal protection element (1), which is arranged on the front side for protecting a diaphragm (11) of a pressure sensor (10) to which pressure is applied. According to the invention, the thermal protection element (1) has, in the region of the sensor diaphragm (11), lamellae (2) which run parallel or are configured as circular arc segments (8) and cover 40% to 60% of the diaphragm surface, with the ratio between the cross-sectional height (h) of the lamellae (2) and the cross-sectional width (b) thereof being 8:1 to 12:1.

17 Claims, 3 Drawing Sheets

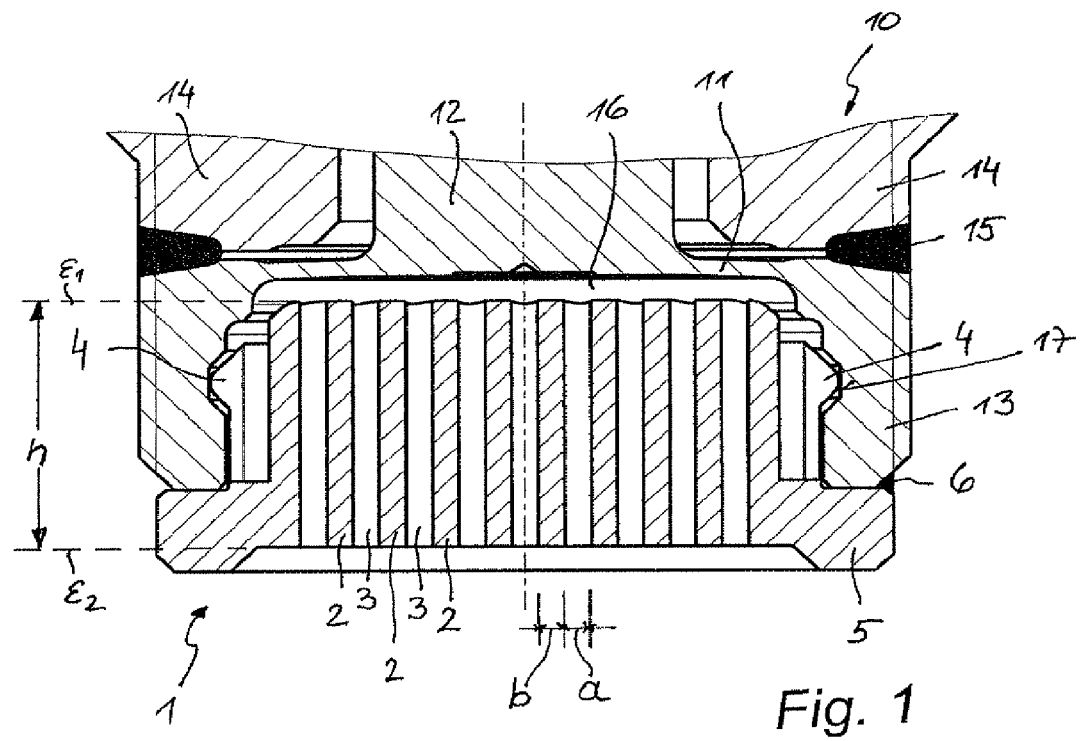

THERMAL PROTECTION ELEMENT FOR A PRESSURE SENSOR

CROSS-REFERENCE TO RELATED APPLICATIONS

The present application is a National Stage Application of PCT International Application No. PCT/EP2011/053864 (filed on May 24, 2011), under 35 U.S.C. §371, which claims priority to Austrian Patent Application No. A 854/2010 (filed on May 25, 2010), which are each hereby incorporated by reference in their respective entireties.

FIELD OF THE INVENTION

The invention relates to a thermal protection element which is arranged on the front side for the protection of a membrane of a pressure sensor that is subjected to pressure.

BACKGROUND OF THE INVENTION

Sensors for the pressure measurement in hot processes, which are used for example in a measuring borehole in the combustion chamber of an internal combustion machine, are subjected to extreme heat flows and pressure pulses. These heat flows lead to very high temperatures in the sensor, which may have an adverse effect on the measuring properties or lead to the destruction of the sensor. Measures are, therefore, known to protect the sensitive front section of the sensor, especially the sensor membrane, with the measuring behavior of the sensor remaining undisturbed by the protection device, however.

The membrane protection before the membrane of a sensor is used to reduce the heat input by thermal radiation and convection into the sensor. In the case of a spark-ignition engine, the flame front in the protection device is to be quenched by the thermal protection in order to reduce reactions of the sensor to the combustion. Protection shall also be ensured in the case of surface ignition and combustion knock in order to prevent the destruction of the sensor by the especially high heat input even under these extreme operating conditions.

In this connection, WO 2007/140641 A1 describes a membrane protection for a sensor which can be screwed into a borehole of a built-in component and is provided with a membrane in the front region, and which comprises a clip system for internal fastening in the front region of the sensor. A sensor with such a membrane protection can be mounted easily in a measuring borehole of a built-in component when the outside radius of the membrane protection is not larger than the outside radius of the sensor. The membrane protection, which comprises a plurality of small boreholes in order to produce contact with a medium to be measured, is provided with hook-like elements which engage into an internal groove in the end region of the sensor. The boreholes shall be provided with a very small diameter on the one hand in order to ensure sufficient membrane protection. Small borehole diameters have a rapid tendency towards coking by combustion residues on the other hand, as a result of which the measuring results will be impaired.

In this connection, a pressure sensor with membrane protection is known from U.S. Patent Publication No. 2004/0237629 A1, with embodiments of the membrane protection being provided with boreholes and oval and slit-like openings. The slit-like openings have a triangular cross-section and are arranged in a cross-like or star-like manner. In the latter case, the opening cross-sections of the membrane protection which are required for a dynamic pressure measurement are hardly achieved, with the regions of the triangular opening cross-sections which taper into a tip also having a tendency towards soot deposits and coking.

A pressure sensor is known from AT 002 036 U1, which comprises a screen-like thermal protection element which is arranged at a small distance from a coated sensor membrane. The thermal protection element comprises a plurality of boreholes parallel to the sensor axis. According to one embodiment, the thermal protection element can also have slit-like openings which are also arranged in parallel or radially.

Generally, thermal protection elements according to the state of the art face two opposing demands and therefore inevitably lead to an unsatisfactory compromise.

Demand A: Flame quenching shall also be enabled in highly charged spark-ignition engines with surface ignition and subsequent combustion knocking This demand can only be fulfilled by especially narrow slits or small boreholes of ≤0.2 mm, because there is a connection between pressure, pressure gradient and borehole cross section for secure quenching of the flame front. In the case of naturally aspirated engines with regular combustion, the diameter of the borehole could also be larger (e.g. 0.4 mm).

Demand B: The tendency towards coking shall be minimized. Modern direct-injection spark-ignition engines produce soot as a result of local lack of air, which can deposit on the walls of the small boreholes and in the cavity between the thermal protection element and sensor membrane, and can prevent precise pressure measurement. This tendency towards coking occurs especially in low borehole diameters and is therefore in conflict with demand A.

Notice must further be taken that for achieving a sufficiently large free cross-section of the thermal protection element at a borehole diameter of 0.2 mm approximately 100 boreholes are necessary even in the case of small sensors with a free cross-section of 7 $mm^2$ (which corresponds to a diameter of approximately 3 mm), which leads to a very complex production effort.

SUMMARY OF THE INVENTION

It is the object of the invention to provide a thermal protection element for a pressure sensor for use in combustion processes which is suitable for highly dynamic measurements and shows a lower coking rate than known thermal protection elements. Furthermore, operational reliability of the thermal protection element shall be guaranteed under all operating states at acceptable cost.

This object is achieved in accordance with the invention in such a way that the thermal protection element comprises lamellae in the region of the membrane, which lamellae extend in parallel or are arranged as circular arc segments and cover 40% to 60% of the membrane surface, with the ratio between the cross-sectional height of the lamellae and the cross-sectional width thereof being 8:1 to 12:1.

The relevant approach and the difference to the state of the art are the abandonment of boreholes and the formation of very thin, planar or curved lamellae or webs. They can be produced economically on modern laser cutting machines or micromilling machines in one integral piece, wherein the interposed openings can be provided with such a narrow configuration that quenching of the flame is ensured under all operational states.

It is understood that holes could also be drilled with such machines, but the thin lamellae have a clearly lower tendency towards coking because shearing stresses occur in the formed coatings and the vibrations in the lamellae lead to the consequence that these coatings will peel off.

In accordance with a preferred embodiment, the distance of the individual lamellae from each other can correspond substantially to the cross-sectional width of the lamellae.

In accordance with a further embodiment of the invention, the thermal protection element for reinforcing the lamellar structure can comprise one or several radial webs, with the individual lamellae approaching said webs preferably at a right angle.

Finally, it is also possible in accordance with the invention to arrange the individual lamellae in an inclined manner in relation to the sensor axis, with an inclination being achieved at their cross-sectional height which substantially corresponds to the distance of the lamellae from one another.

BRIEF DESCRIPTION OF THE DRAWINGS

The invention will be explained below in closer detail by reference to the drawings, wherein:

FIG. 1 illustrates an axial sectional view of a thermal protection element in accordance with the invention, inserted into the membrane cup of a pressure sensor.

FIG. 2 illustrates the thermal protection element of FIG. 1 in a three-dimensional view.

DETAILED DESCRIPTION OF EMBODIMENTS

Figure 3:
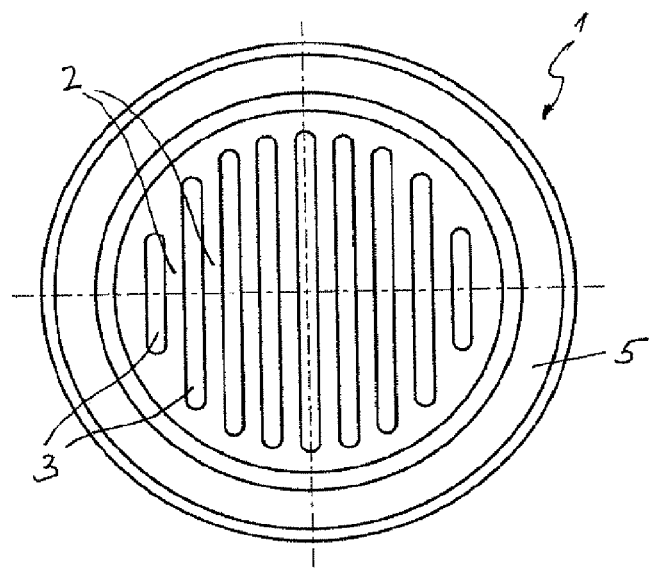
FIG. 3 illustrates the thermal protection element of FIG. 1 in a top view from the front.

FIGS. 1 to 3 illustrate a first embodiment of the thermal protection element in accordance with the invention. In the sectional view of FIG. 1, the thermal protection element 1 is arranged on the front-side end of a pressure sensor 10, of which only the front section is shown. The sensor membrane 11 of the pressure sensor 10 forms a membrane stamp 12 in the central region, which stamp acts on a pressure measuring element (not shown in closer detail) such as a piezoelectric element. The membrane 11 is welded together with the housing 14 of the pressure sensor 10 (see weld seam 15), with a membrane cup 13 being formed which accommodates the thermal protection element 1.

The thermal protection element 1 comprises narrow, parallel extending lamellae 2 in the region of the sensor membrane 11, which lamellae cover approximately 40% to 60% of the membrane surface, with the ratio between the cross-sectional height h of the lamellae 2 and the cross-sectional width b thereof being 8:1 to 12:1. Effective quenching of the flame front can be achieved thereby even under extreme operational conditions.

A cavity 16 is formed between the thermal protection element 1 and the surface of the sensor membrane 11, the gap width of which corresponds substantially to the distance a of the individual lamellae 2 in the range of approximately 0.5 mm up to less than 0.25 mm.

In the illustrated example, the distance a of the individual lamellae 2 from one another and the width of the elongated openings 3 substantially correspond to the cross-sectional width b of the lamellae, so that a covering degree of the membrane 11 of approximately 50% is achieved.

Holding means 4 are arranged in accordance with the invention on the outer circumference of the thermal protection element 1, which holding means rest resiliently on the inner circumference of the membrane cup 13 of the pressure sensor 1. The holding means 4 can rest thereon in a frictionally engaged manner, or can latch into a groove 17 on the inner circumference of the membrane cup 13 (as illustrated in FIG. 1).

The holding means 4 of the thermal protection element 1 in accordance with the invention are arranged in a compact manner between two planes $\epsilon_1$, $\epsilon_2$ which delimit the height h of the lamellae 2, and do not protrude beyond the body of the thermal protection element as in the membrane protection according to WO 2007/140641 A1, for example.

The thermal protection element 1 comprises a holding flange 5 on the outer circumference which rests on the face end of the membrane cup 13 of the pressure sensor 1, wherein the holding flange 5 can optionally also be welded together with the face end of the membrane cup 13 (see weld points 6 in FIG. 1).

Figure 4:
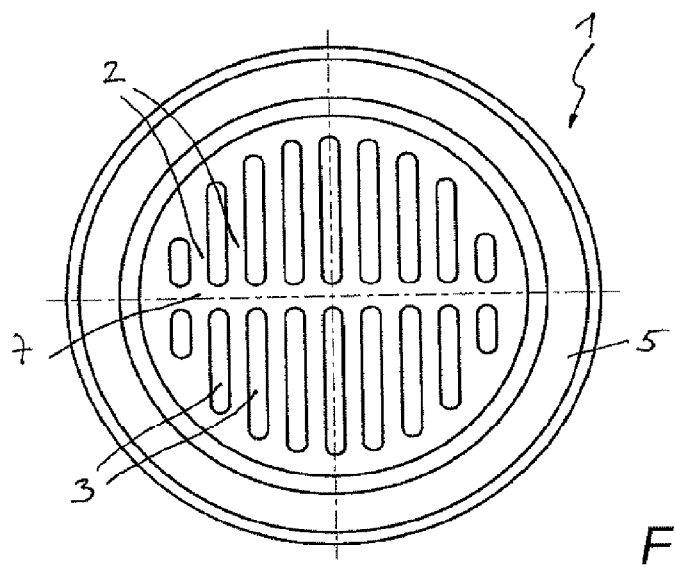
FIG. 4 illustrates an embodiment of the thermal protection element of FIG. 3 with a web along the diameter.

In accordance with an embodiment illustrated in FIG. 4, the thermal protection element 1 can comprise one or several radial webs 7, with the individual lamellae 2 approaching said web or webs preferably at a right angle. FIG. 4 shows a radial web 7 extending along the diameter, which web is used for stiffening the lamellae 2 of the thermal protection element. Such radial webs 7 can also be arranged in form of a cross or other geometries.

Figure 5:
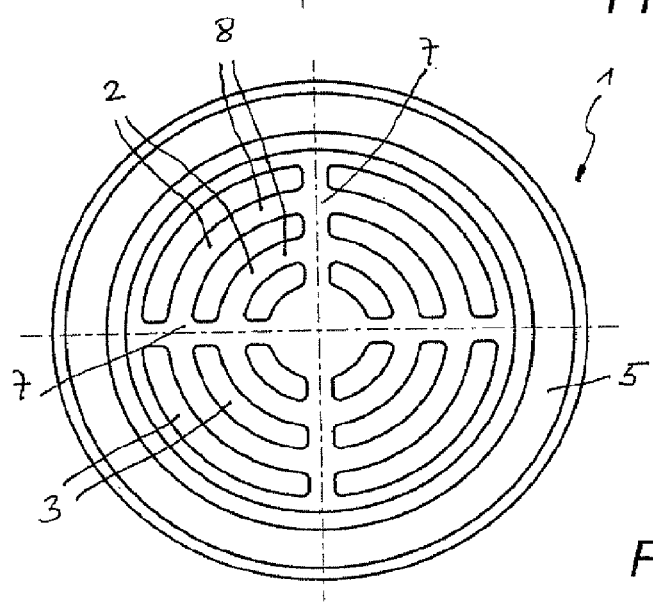
FIG. 5 illustrates an embodiment of the thermal protection element of FIG. 3 with curved lamellae.

Accordingly, FIG. 5 illustrates an embodiment of the thermal protection element 1 in which the lamellae 2, supported by the webs 7 arranged in the manner of a cross, are arranged as circular arc segments 8.

Figure 6:
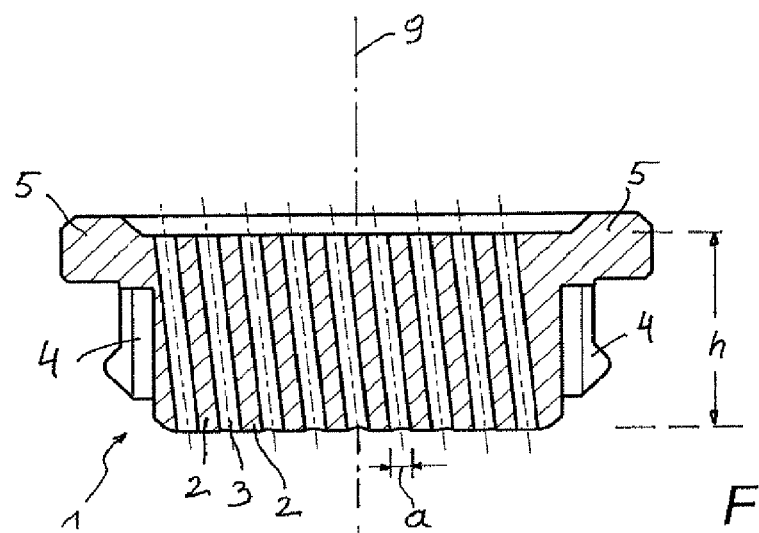
FIG. 6 illustrates a sectional view of a variant of the thermal protection element with obliquely positioned lamellae.
Figure 7:
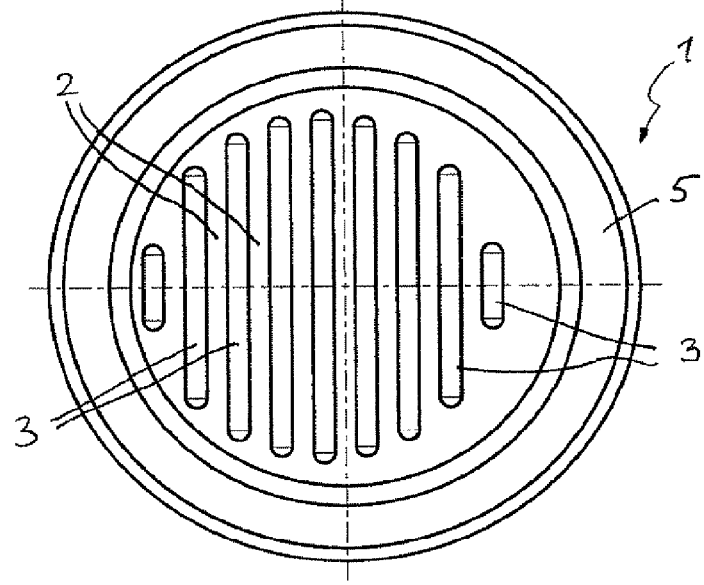
FIG. 7 illustrates the thermal protection element of FIG. 6 in a front top view.

The embodiment illustrated in FIGS. 6 and 7 includes a thermal protection element 1, in which the individual lamellae 2 are arranged to be inclined in relation to the sensor axis 9 and have an inclination at their cross-sectional height h which substantially corresponds to the distance a of the lamellae 2 from each other. As a result of this measure, the surface of the sensor membrane will be shaded off entirely by the obliquely disposed lamellae 2 in the case of thermal radiation impinging parallel to the sensor axis 9.

The invention claimed is:

1. A thermal protection element, which is arranged on a front side for the protection of a membrane of a pressure sensor that is subjected to pressure, the thermal protection element comprising:
   lamellae in a region of the membrane, which lamellae extend in parallel or are arranged as circular arc segments and cover 40% to 60% of the membrane surface, with a ratio between the cross-sectional height of the lamellae and the cross-sectional width thereof being 8:1 to 12:1.

2. The thermal protection element of claim 1, wherein the distance between individual lamellae is less than 0.5 mm.

3. The thermal protection element of claim 1, wherein the distance between individual lamellae is less than 0.25 mm.

4. The thermal protection element of claim 1, wherein the distance of individual lamellae from each other substantially corresponds to the cross-sectional width of the lamellae.

5. The thermal protection element of claim 1, wherein individual lamellae are arranged obliquely in relation to a sensor axis.

6. The thermal protection element of claim 5, wherein individual lamellae have an inclination at their cross-sectional height which substantially corresponds to the distance of the lamellae from each other.

7. The thermal protection element of claim 1, further comprising at least one radial web.

8. The thermal protection element of claim 7, wherein individual lamellae approach said at least one web at a right angle.

9. The thermal protection element of claim 1, further comprising a plurality of holding mechanisms arranged on an outer circumference of the thermal protection element.

10. The thermal protection element of claim 9, wherein the holding mechanisms rest resiliently on an inner circumference of a membrane cup of the pressure sensor.

11. The thermal protection element of claim 10, wherein the holding mechanisms latch into a groove on the inner circumference of the membrane cup.

12. The thermal protection element of claim 10, wherein the holding mechanisms are arranged between two planes which delimit the height of the lamellae.

13. The thermal protection element of claim 1, further comprising a holding flange arranged on an outside circumference of the thermal protection element.

14. The thermal protection element of claim 13, wherein the holding flange rests on a face end of a membrane cup of the pressure sensor.

15. The thermal protection element of claim 14, wherein the holding flange is welded together with the face end of the membrane cup.

16. The thermal protection element of claim 1, wherein the thermal protection element is produced integrally by micromilling.

17. The thermal protection element of claim 1, wherein the thermal protection element is produced integrally by laser cutting.

* * * * *